United States Patent
Stevens et al.

(10) Patent No.: US 10,979,446 B1
(45) Date of Patent: Apr. 13, 2021

(54) AUTOMATED VULNERABILITY CHAINING

(71) Applicant: Amazon Technologies, Inc., Seattle, WA (US)

(72) Inventors: Joshua Eugene Stevens, Austin, TX (US); Matthew Block, Seattle, WA (US); Dennis Wayne Kuntz, Waxhaw, NC (US)

(73) Assignee: Amazon Technologies, Inc., Seattle, WA (US)

( * ) Notice: Subject to any disclaimer, the term of this patent is extended or adjusted under 35 U.S.C. 154(b) by 310 days.

(21) Appl. No.: 16/050,943

(22) Filed: Jul. 31, 2018

(51) Int. Cl.
*H04L 29/06* (2006.01)

(52) U.S. Cl.
CPC ...... *H04L 63/1433* (2013.01); *H04L 63/1408* (2013.01); *H04L 63/1441* (2013.01)

(58) Field of Classification Search
CPC .. H04L 63/1438; H04L 63/1441; H04L 63/14
See application file for complete search history.

(56) References Cited

U.S. PATENT DOCUMENTS

| | | | | |
|---|---|---|---|---|
| 2011/0283146 | A1* | 11/2011 | Nemecek | G06F 11/008 714/37 |
| 2013/0060598 | A1* | 3/2013 | Dudley | G06Q 10/08 705/7.28 |
| 2015/0106873 | A1* | 4/2015 | Marsh | G06Q 10/0635 726/1 |
| 2018/0191768 | A1* | 7/2018 | Broda | H04L 63/1433 |

* cited by examiner

*Primary Examiner* — Dao Q Ho
(74) *Attorney, Agent, or Firm* — Thomas | Horstemeyer, LLP (57) ABSTRACT

Disclosed are various embodiments for automated vulnerability chaining. A vulnerability chaining engine receives data indicating that a plurality of vulnerabilities are present in at least one host. The vulnerabilities are individually assigned a respective default risk score. The vulnerability chaining engine determines that an exploitation of a combination of the vulnerabilities would result in a greater risk score for the host(s) than indicated by the respective default risk scores based at least in part on respective vulnerability types associated with the individual vulnerabilities. A chained risk score that is higher than the respective default risk scores is assigned to the individual vulnerabilities.

20 Claims, 5 Drawing Sheets

Security Operations Dashboard

| Host | Threat Type | Risk | Chained Risk | |
|---|---|---|---|---|
| IP Address 1 | Remotely Detectable | Medium | Critical | ← 103a |
| IP Address 1 | Privilege Escalation | Medium | Critical | ← 103b |
| IP Address 2 | Remotely Detectable | Medium | N/A | ← 103c |
| IP Address 3 | Privilege Escalation | Medium | N/A | ← 103d |
| IP Address 4 | Privilege Escalation | Medium | N/A | ← 103e |
| IP Address 5 | Remotely Detectable | Medium | N/A | ← 103f |

AUTOMATED VULNERABILITY CHAINING

BACKGROUND

Managing computer system and network security for a large organization can be challenging. Monitoring agents and threat intelligence sources may automatically monitor systems and networks for security vulnerabilities and then present the results via a dashboard. Detected vulnerabilities may be scored according to a risk or severity level, for instance, low, medium, or high. In large organizations, security administrators may focus on vulnerabilities with a high severity level before addressing vulnerabilities with a low or medium severity level.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to automated vulnerability chaining. Security vulnerabilities may be assigned a relative risk or severity level, such as low, medium, high, or critical. These severity levels may be used by security administrators to help prioritize the vulnerabilities. However, in some instances, vulnerabilities that are deemed by threat intelligence sources to be low or medium risk may ultimately pose a great risk. This is because attackers may be able to exploit a combination of multiple low or medium vulnerabilities on a single system or network of related systems in order to gain access that would otherwise be deemed a critical risk.

For example, a system may have a first vulnerability that may allow an attacker to gain access to the system as a restricted user. At the same time, the system may have a second vulnerability that allows a restricted user to gain administrative privileges. Each of these individually may be scored as a medium risk by a threat intelligence source. Yet, when exploited together by an attacker, the two vulnerabilities result in a chained vulnerability that allows attackers to gain administrative access to the system, which would otherwise be deemed a critical risk.

Various embodiments of the present disclosure introduce automated vulnerability chaining that enables a determination that two or more vulnerabilities identified by one or more threat intelligence sources can be chained together, thereby resulting in a greater risk. This results in increasing the relative priority of the chained vulnerabilities for the security administrators. As will be described, automated logic may perform a chaining analysis with respect to attributes within a host or network of related hosts. The chaining analysis can be used to associate a greater risk or severity level with a vulnerability than otherwise would be assigned. In addition, recommendations for remedial actions may be generated so as to minimize efforts necessary to break the chain and reduce the risk.

As one skilled in the art will appreciate in light of this disclosure, certain embodiments may be capable of achieving certain advantages, including some or all of the following: (1) improving computer system and network security by automatically recognizing the presence of vulnerabilities that when chained result in a higher risk level than when individually evaluated; (2) improving computer system and network security by automatically recommending actions that may be taken to disrupt the chaining of vulnerabilities and reduce risk; (3) improving the operation of computers implementing threat intelligence sources by enabling them to detect previously unrecognized threats in an automated manner; (4) decreasing operational overhead in responding to computer security threats by performing simplified remedial actions designed to break a chain for a chained vulnerability rather than remediating every component of the chained vulnerability, thereby resulting in fewer computer reboots or patches being applied; (5) allowing for automated evaluation of more complex security scenarios on a preventative basis, rather than during or after a compromise; and so forth.

Figure 1:
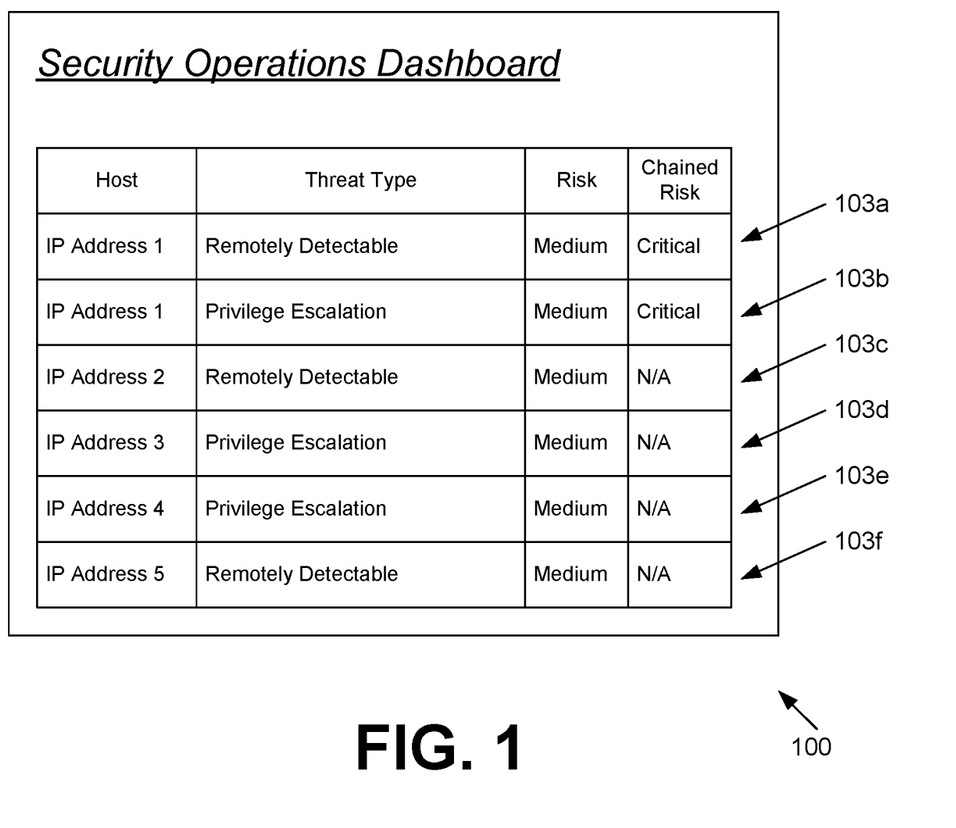
FIG. 1 is a drawing of an example user interface according to various embodiments of the present disclosure.

Beginning with FIG. 1, shown is an example user interface 100 generated by a threat intelligence source according to one or more embodiments of the present disclosure. The user interface 100 corresponds to a security operations dashboard that presents a plurality of detected threats 103 on a network to an administrative user. Each of the threats 103 may be associated with a host, a threat type, a risk score, and a chained risk score, among other information. In this non-limiting example, each of the threats 103a, 103b, 103c, 103d, 103e, and 103f is associated with a risk score of "medium."

However, threats 103a and 103b pertain to a single host on the network ("IP Address 1") and involve different threat types. In particular, threat 103a is remotely detectable, while threat 103b involves privilege escalation. While each of the threats 103a and 103b may be individually scored as a medium risk, when both are present on a single host, the chained risk may be greater than just a medium risk. Exploitation of a merely remotely detectable threat may not be a great risk if the attacker is not able to gain administrative privileges on the host. Yet, if the attacker is also able to gain administrative privileges, the threat may be transformed to a critical risk. To this end, according to principles of the present disclosure, threats 103a and 103b are assigned a chained risk score of a critical risk. In the following discussion, a general description of the system and its components is provided, followed by a discussion of the operation of the same.

Figure 2:
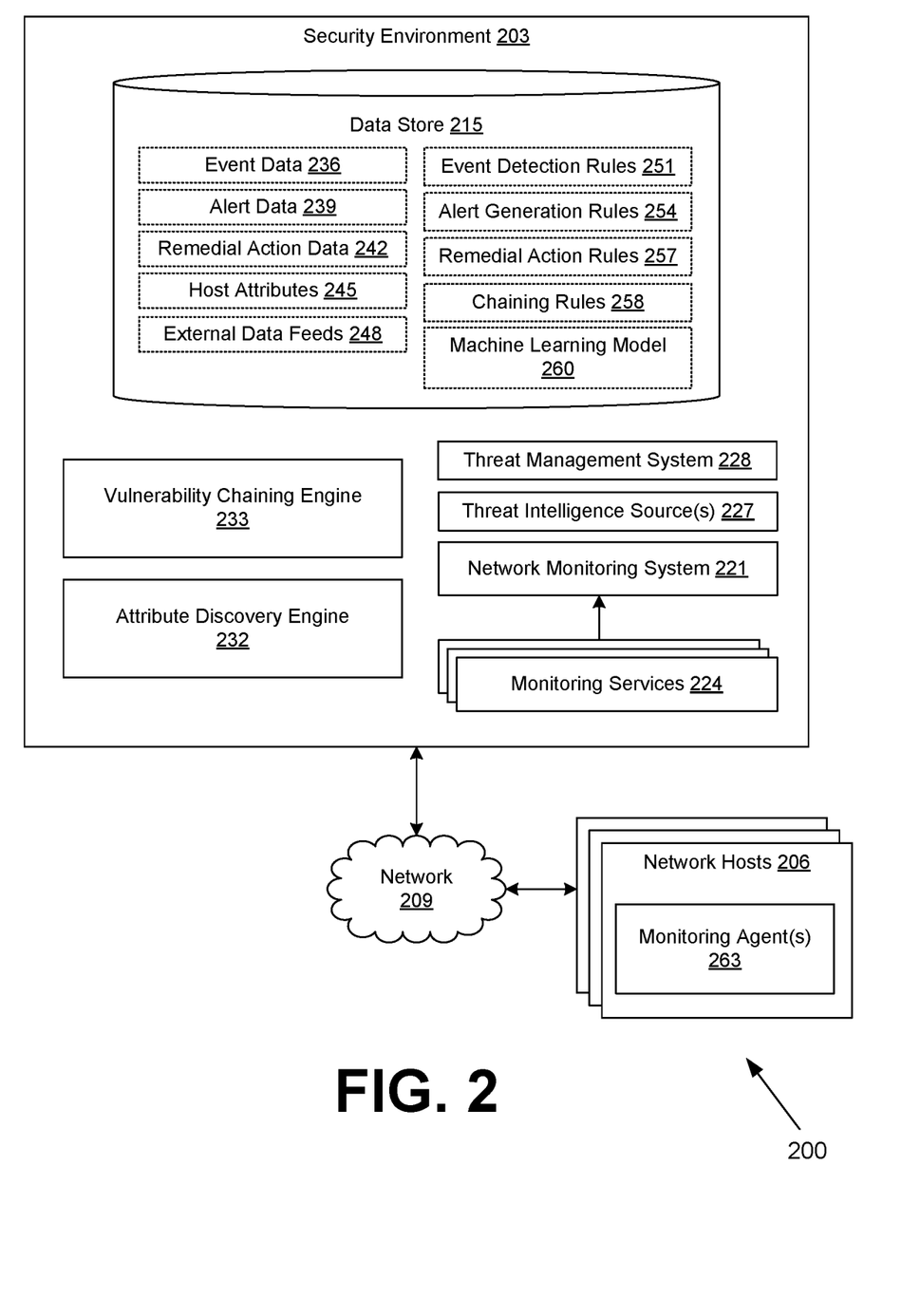
FIG. 2 is a schematic block diagram of a networked environment according to various embodiments of the present disclosure.

With reference to FIG. 2, shown is a networked environment 200 according to various embodiments. The networked environment 200 includes a security environment 203 and a plurality of network hosts 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The security environment 203 may comprise, for example, a server computer or any other system providing computing capability. Alternatively, the security environment 203 may employ a plurality of computing devices that may be arranged, for example, in one or more server banks or computer banks or other arrangements. Such computing devices may be located in a single installation or may be distributed among many different geographical locations. For example, the security environment 203 may include a plurality of computing devices that together may comprise a hosted computing resource, a grid computing resource, and/or any other distributed computing arrangement. In some cases, the security environment 203 may correspond to an elastic computing resource where the allotted capacity of processing, network, storage, or other computing-related resources may vary over time.

Various applications and/or other functionality may be executed in the security environment 203 according to various embodiments. Also, various data is stored in a data store 215 that is accessible to the security environment 203. The data store 215 may be representative of a plurality of data stores 215 as can be appreciated. The data stored in the data store 215, for example, is associated with the operation of the various applications and/or functional entities described below.

The components executed on the security environment 203, for example, include a network monitoring system 221, a plurality of monitoring services 224, one or more threat intelligence sources 227, a threat management system 228, an attribute discovery engine 232, a vulnerability chaining engine 233, and other applications, services, processes, systems, engines, or functionality not discussed in detail herein. The network monitoring system 221 is executed to monitor various aspects of operation of the network 209 and/or the network hosts 206. In this regard, the network monitoring system 221 may function to aggregate streams of event data generated by the monitoring services 224. For example, one monitoring service 224 may track network connections through a particular firewall on the network 209, while another monitoring service 224 may track log-ins on one or more network hosts 206. Monitoring services 224 may provide network connection pair data, actual packet data from the network 209, sniffed packet headers, file hashes, and/or other event data. The network monitoring system 221, through aggregation, may summarize or condense the streams of event data from the monitoring services 224 into fewer streams of event data.

The threat intelligence source(s) 227 may include an intrusion detection system. To this end, the threat intelligence source(s) 227 may be executed to process the streams of event data from the network monitoring system 221 through a rule-based analysis to generate threat alerts. In this rule-based analysis, the threat intelligence source 227 looks for anomalies in the streams of event data that are correlated to known Indicators of Compromise (IoC). As an example, the threat intelligence source 227 may identify outbound network traffic to an internet protocol (IP) address corresponding to a known malware command and control network. As another example, the threat intelligence source 227 may identify inbound network traffic from an IP address corresponding to a known botnet. As still another example, the threat intelligence source 227 may identify an installation of files on network hosts 206 that correspond to known malware files. The threat intelligence source 227 may be configured to assign a risk score to each threat alert corresponding to severity or significance, which may inform the security administrator how to prioritize remediating the threats.

The threat management system 228 may further include logic executed to facilitate management of security incidents by human users who are security administrators. In this regard, the threat management system 228 may include task tracking and ticket management functionality. The threat management system 228 may send emails, text messages, pages, voice messages, or other communications to alert security administrators to urgent incidents. The threat management system 228 can include functionality to record remedial actions taken, escalate to other users, and mark tasks as resolved. The threat management system 228 may generate user interfaces such as network pages, mobile application screens, and so on, that correspond to administrative dashboards.

Also, the threat intelligence source 227 and/or the threat management system 228 may recommend or cause one or more remedial actions to be performed in response to an alert. Such actions may include configuring a router or firewall to remove access to the network 209 for one or more network hosts 206, quarantining suspicious files on a network host 206 (e.g., so that the files cannot easily be executed), configuring a router or firewall to block inbound or outbound network access for one or more network addresses or ports, or other actions.

The attribute discovery engine 232 is executed to inspect network hosts 206 for various attributes. The attribute discovery engine 232 may scan the network hosts 206 periodically or in response to certain events (e.g., a change in configuration of the network hosts 206). The attribute discovery engine 232 may discover attributes such as types of accounts on the network host 206, routing table size, process table size, particular utilities installed on the network host 206, and so forth. These attributes may impact a chained risk score for a given threat.

The vulnerability chaining engine 233 is executed to review threat alerts identified by the threat intelligence source 227 and to determine groupings of threats that when exploited in combination by an attacker would result in a greater risk than otherwise identified by the threat intelligence source 227. This may result in a chained risk score being assigned to each of the threat alerts in the grouping that is higher than the maximum risk score assigned by default by the threat intelligence source 227. Further, the vulnerability chaining engine 233 may also generate a recommended remedial action in order to break the chain to lower the risk to at or below the maximum default risk score. The vulnerability chaining engine 233 may select a remedial action requiring a minimal amount of effort to break the chain and have the desired result.

Different threat intelligence sources 227 may have different formats for alerts or Indicators of Vulnerability (IoV). The vulnerability chaining engine 233 may recognize these different formats or indicators and may normalize them to standardized IoVs. This normalization process may include assigning standardized vulnerability types or classifications to the vulnerabilities from a defined set. Alternatively, the threat intelligence sources 227 may be configured to output or export normalized or standardized IoVs.

It is noted that the security environment 203 or its constituent components (e.g., the attribute discovery engine 232 and/or the vulnerability chaining engine 233) may be operated as a service on behalf of external entities and organizational units. In such cases, the monitoring services 224 may be executed on external systems and communicate with the security environment 203 via the network 209.

The data stored in the data store 215 includes, for example, event data 236, alert data 239, remedial action data 242, host attributes 245, external data feeds 248, event detection rules 251, alert generation rules 254, remedial action rules 257, chaining rules 258, a machine learning model 260, and potentially other data. The event data 236 includes a stream of events generated by the network monitoring system 221 based upon monitoring data from the monitoring services 224.

The alert data 239 includes threat alerts generated by the threat intelligence source 227 as a consequence of a rule-based analysis of the event data 236. Alerts may be associated with varying risk scores, such as relative priorities and relative severity levels (e.g., low, medium, high, or critical), which can affect how the alerts are presented to users and/or whether remedial actions are automatically implemented.

The remedial action data 242 includes remedial actions recommended by the threat intelligence source 227 or implemented by the threat management system 228 based upon the generated alerts. The remedial action data 242 may also track manually initiated remedial actions that are initiated by users in response to alerts.

The host attributes 245 correspond to various characteristics or attributes of a network host 206 that may impact a chained risk score for a security threat. The host attributes 245 may include attributes recorded by an administrative user and/or attributes automatically discovered through the operation of the attribute discovery engine 232. The host attributes 245 may generally indicate an ease of data exfiltration from a network host 206, a security importance of the network host 206, a network communication profile for the network host 206, or other characteristics.

Non-limiting examples of host attributes 245 may include whether a database is present on the network host 206, uptime of the network host 206 or whether the uptime meets an uptime threshold, persistence of the network host 206 or whether the persistence meets a persistence threshold, whether the network host 206 has a hardened security state, particular utilities installed on the network host 206, network routing table characteristics or whether the network routing table meets a quantity threshold, process table characteristics or whether the process table meets a quantity threshold, and network element characteristics of the network host 206 or whether the quantity of network elements on the network host 206 meets a quantity threshold.

Non-limiting examples of host attributes 245 may also include user activity log characteristics (e.g., the output of the "last" utility on Unix-like systems) or whether a user activity log meets a quantity threshold, user account characteristics or whether a quantity of user accounts on the network host 206 meets a quantity threshold, security characteristics of user accounts on the network host 206 or whether any accounts on the network host 206 meet a security threshold, and so forth.

The external data feeds 248 are obtained from third-party services and provide threat intelligence that may be incorporated by a threat intelligence source 227 or a threat management system 228. For example, the external data feeds 248 may include known IoCs corresponding to structured information that describes one or more items of data or conditions that may be used to identify a potential security compromise. The known IoCs may include, for example, uniform resource locators (URLs), Internet protocol (IP) addresses, or domain names that are accessed by malware programs, file signatures corresponding to malware files, names of processes corresponding to malware processes, kernel modules corresponding to malware, and so on.

The event detection rules 251 correspond to rules that control how the network monitoring system 221 is to detect and generate events from the monitoring data obtained from the monitoring services 224. For example, the event detection rules 251 may specify thresholds for events to be generated, or that a combination of conditions should be present.

The alert generation rules 254 correspond to rules that control how the threat intelligence source 227 recognizes threat conditions from the event data 236 and generates alerts. The alert generation rules 254 may be based at least in part on known indicators of compromise, which may be manually curated, automatically determined, or imported from external data feeds 248. The alert generation rules 254 may also control default risk scoring of alerts, which may in turn control how administrative users are notified or whether remedial actions are automatically taken.

The remedial action rules 257 are rules that control how the threat intelligence source 227 recommends or how a threat management system 228 recommends and/or automatically implements remedial actions. A given alert may have one more recommended remedial actions, such as disabling or limiting network access of a network host 206, updating a firewall rule, rotating security credentials, adding network addresses to black lists, and so forth. The remedial action rules 257 may also include rules employed by the vulnerability chaining engine 233 to identify remedial actions to break a chain of related vulnerabilities. In particular, the remedial action rules 257 may be used to determine an optimal remedial action to minimize administrative time and/or downtime in order to lower a chained risk score for threats to a default risk score.

The chaining rules 258 are rules that control how chained risk scores are assigned to groupings of vulnerabilities that are identified. In particular, the chaining rules 258 control the determination that a set of vulnerabilities affecting a network host 206 or a network 209 of related network hosts 206 can be exploited in combination to form a greater risk than that of the individual vulnerabilities. The chaining rules 258 may take into account different vulnerability types or classifications that are associated with the vulnerabilities, where a combination of different vulnerability types may increase the overall risk associated with the combination of the vulnerabilities. For example, the vulnerability types may include a remotely detectable vulnerability type, a remotely exploitable vulnerability type, a privilege-escalation vulnerability type, a patch-available vulnerability type, a local-authentication-required vulnerability type, and/or other vulnerability types. It is noted that a remotely detectable vulnerability may or may not be remotely exploitable.

The machine learning model 260 is developed by the vulnerability chaining engine 233 based at least in part on baseline empirical data and manually curated data in order to adjust one or more of the chaining rules 258. The baseline empirical data may include data regarding the observed severity of previous compromises or attacks and default risk scores assigned to the corresponding vulnerabilities. Moreover, the machine learning model 260 may be continually updated and refined based upon the continued operation of the threat management system 228 and the network monitoring system 221 and manual interventions in those systems.

The network hosts 206 are representative of a plurality of client or server devices that may be coupled to the network 209. The network hosts 206 may comprise, for example, a processor-based system such as a computer system. Such a computer system may be embodied in the form of a server, a router, a firewall, a desktop computer, a laptop computer, personal digital assistants, cellular telephones, smartphones, set-top boxes, music players, web pads, tablet computer systems, game consoles, electronic book readers, voice interface devices, or other devices. A network host 206 may execute a monitoring agent 263, which may report information about the network host 206 to the monitoring services 224, the network monitoring system 221, and/or the attribute discovery engine 232.

Figure 3:
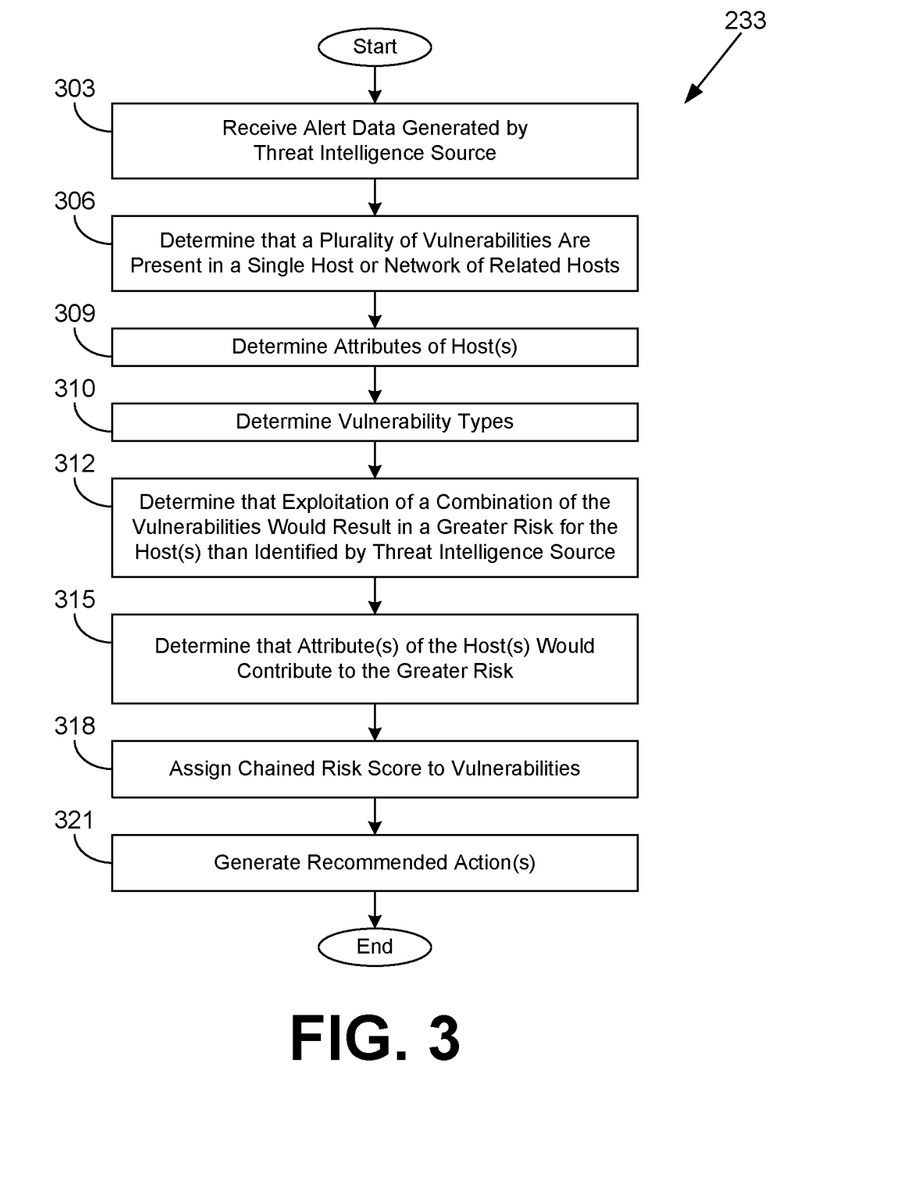
FIGS. 3 and 4 are flowcharts illustrating examples of functionality implemented as portions of a vulnerability chaining engine executed in a security environment in the networked environment of FIG. 2 according to various embodiments of the present disclosure.

Referring next to FIG. 3, shown is a flowchart that provides one example of the operation of a portion of the vulnerability chaining engine 233 according to various embodiments. It is understood that the flowchart of FIG. 3 provides merely an example of the many different types of functional arrangements that may be employed to implement the operation of the portion of the vulnerability chaining engine 233 as described herein. As an alternative, the flowchart of FIG. 3 may be viewed as depicting an example of elements of a method implemented in the security environment 203 (FIG. 2) according to one or more embodiments.

Beginning with box 303, the vulnerability chaining engine 233 receives alert data 239 (FIG. 2) generated by the threat intelligence source 227 (FIG. 2).

The alert data 239 may describe alerts for multiple vulnerabilities across multiple network hosts 206 (FIG. 2) on the network 209 (FIG. 2). The vulnerabilities may individually be associated with a respective risk score determined by the threat intelligence source 227. The respective risk score is based upon the severity of the threat posed by the vulnerability individually.

In box 306, the vulnerability chaining engine 233 determines from the alert data 239 that a plurality of vulnerabilities are present in a single network host 206 or a network 209 of related network hosts 206. The related network hosts 206 may be related such that, for example, gaining lower-level access via an exploit of one network host 206 may enable access to another network host through which high-level access may be achieved through another exploit.

In box 309, the vulnerability chaining engine 233 determines attributes of the network hosts 206 having the vulnerabilities from the host attributes 245. The host attributes 245 may be manually configured or updated by operation of the attribute discovery engine 232. The host attributes 245 may be broadly categorized into susceptibility attributes, system attributes, application attributes, network attributes, or user attributes.

In box 310, the vulnerability chaining engine 233 determines the vulnerability types for each of the identified vulnerabilities on the network host(s) 206. For example, a given vulnerability may be a remotely detectable vulnerability type, a remotely exploitable vulnerability type, a privilege-escalation vulnerability type, a patch-available vulnerability type, a local-authentication-required vulnerability type, or another vulnerability type. It is noted that a single vulnerability may be classified into multiple vulnerability types, and the threat intelligence source 227 may assign a default risk score to the vulnerability in view of the vulnerability type(s) associated with the vulnerability.

In box 312, the vulnerability chaining engine 233 determines, using the chaining rules 258 (FIG. 2), that an exploitation of a combination of the vulnerabilities would result in a greater risk for the network host(s) 206 than the respective default risk scores identified by the threat intelligence source 227. This determination may be based at least in part on the vulnerability types associated with the vulnerabilities. For example, a first vulnerability may be remotely detectable but of a low risk. A second vulnerability may not be remotely detectable but no patch is available, and thus the second vulnerability is classified as a medium risk. Yet, the combination of the two, when exploited, may be of a high risk. The presence of the first vulnerability may allow the attacker to detect and exploit the second vulnerability, which otherwise would not be detectable or exploitable.

In box 315, the vulnerability chaining engine 233, using the chaining rules 258, determines that the host attribute(s) 245 of the network hosts 206 would contribute to the greater risk. To begin, system attributes may make certain network hosts 206 more or less vulnerable to attacks. For example, if a database is present on a network host 206, attackers may be more likely to target it. By contrast, if the network host 206 uses an expired, self-signed secure certificate, attackers may be less likely to target it. Systems that have a high host uptime meeting a threshold may be targets, as they may be unmaintained and lacking required patches. By contrast, maintained systems may be rebooted periodically to apply patches. Also, systems that have a high measure of persistence meeting a persistence threshold may be more valuable targets than systems that are launched and terminated after a short period. For example, a system that has been in service for a year may be more important than a system that was just launched a few weeks ago. Moreover, systems that have a hardened security state (e.g., running an operating system known for security, or implementing strong cryptography) may be more attractive targets than ordinary systems, as the hardened security state may be seen to protect valuable data or services.

Application host attributes 245 may also make network hosts 206 more or less vulnerable to attacks. Common utilities installed on a network host 206 for use of system administrators or other users may be seen as desirable for attackers to scan for other vulnerabilities or to exfiltrate data from the network host 206. Such utilities may include netcat, metasploit, python, nmap, and others. Certain operating systems, e.g., Kali Linux, may have applications that may be desirable for attackers.

Network host attributes 245 may also make network hosts 206 more or less vulnerable to attacks. A network routing table, such as an arp table, may indicate that a network host 206 is communicating with a quantity of other network hosts 206 meeting a quantity threshold that would be desirable for an attacker. If a network host 206 communicates with many other network hosts 206, an attacker could scan or exploit the other network hosts 206 more easily without being noticed. A process table may indicate that the network host 206 executes a quantity of processes meeting a quantity threshold that would be desirable for an attacker. If a network host 206 executes many processes, processes executed by the attacker could go by unnoticed. Further, a quantity of network elements (e.g., other systems, other services, etc.) to which the network host 206 has access may be desirable for an attacker when the quantity meets a quantity threshold.

User host attributes 245 may also make network hosts 206 more or less vulnerable to attacks. If a user activity log indicates that many users are using a system, it is less likely that a login by the attacker would be noticed. If many accounts are present on a network host 206, the network host 206 may be more desirable for compromise by an attacker. For example, the attacker might exfiltrate a password hash file, and the more passwords that are represented, the more likely that one can be cracked. Also, if an account on the network host 206 meets a security threshold or level of security access, the network host 206 may be targeted in order to gain access to the account to access other resources that require the security threshold to be met.

In box 318, the vulnerability chaining engine 233, using the chaining rules 258, assigns a chained risk score to the combination of the vulnerabilities. The chained risk score may be increased from the maximum default risk score by adding amounts based on the combination of vulnerability types for the grouping of vulnerabilities and amounts based on the host attributes 245.

In box 321, the vulnerability chaining engine 233 may generate recommended actions to remediate the chain of vulnerabilities. In one embodiment, the vulnerability chaining engine 233 may determine an optimal or minimal set of actions in order to lower the risk to the default risk score. The actions may be optimal through a minimal amount of administrator time or through a minimal amount of system downtime. In some cases, the actions may be optimal to minimize impacts to system stability by minimizing patching or other actions that may cause system instability. It may be that of the set of vulnerabilities associated with a critical chained risk score, only one vulnerability need be remediated in order to reduce the risk scores to medium. Where multiple options are available, the vulnerability chaining engine 233 may recommend an action that is easier to perform administratively, or results in lesser downtime. Thereafter, the operation of the portion of the vulnerability chaining engine 233 ends.

Figure 4:
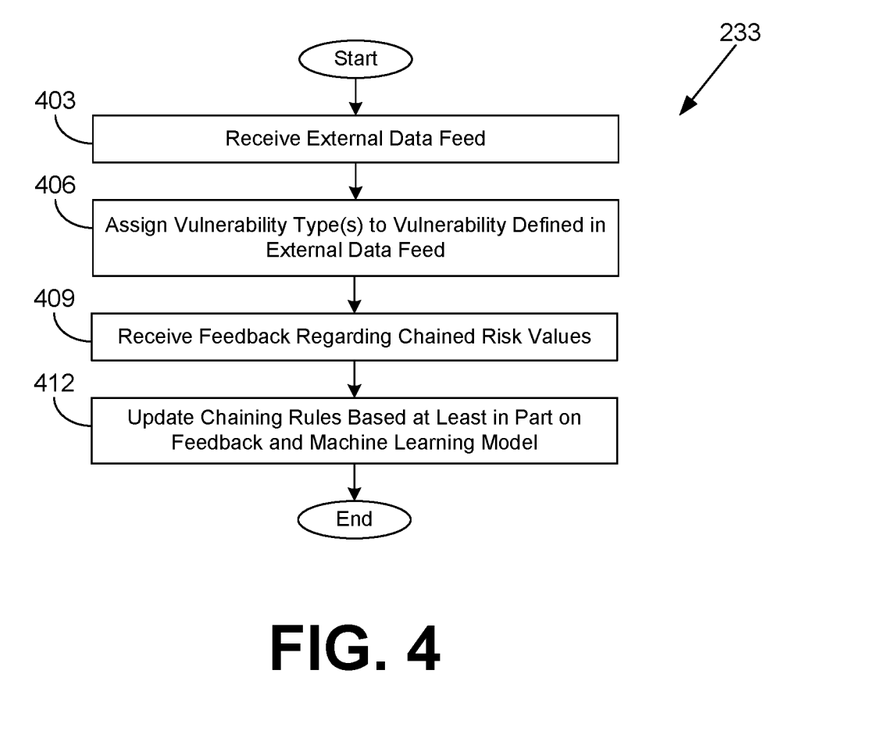

Turning now to FIG. 4, shown is a flowchart that provides one example of the operation of another portion of the vulnerability chaining engine 233 according to various embodiments. It is understood that the flowchart of FIG. 4 provides merely an example of the many different types of functional arrangements that may be employed to implement the operation of the portion of the vulnerability chaining engine 233 as described herein. As an alternative, the flowchart of FIG. 4 may be viewed as depicting an example of elements of a method implemented in the security environment 203 (FIG. 2) according to one or more embodiments.

Beginning with box 403, the vulnerability chaining engine 233 receives an external data feed 248 (FIG. 2), which may describe a new or different vulnerability than previously recognized by the threat intelligence source 227 (FIG. 2). The external data feed 248 may be received from one or more services operated by third parties. The new or different vulnerability may correspond to a zero-day vulnerability.

In box 406, the vulnerability chaining engine 233 may assign one or more vulnerability types to the vulnerability defined in the external data feed 248 based at least in part on the machine learning model 260 (FIG. 2), which may be trained on characteristics of many different vulnerabilities. For example, the vulnerability chaining engine 233 may assign a standardized or normalized IoV to the vulnerability defined in the external data feed 248, which may not use the standardized or normalized IoVs.

In box 409, the vulnerability chaining engine 233 may receive feedback regarding chained risk values assigned to combinations of vulnerabilities. The feedback may comprise manual feedback, such as an administrator reporting that a chained risk value is appropriate, excessive, or too low. The feedback may also comprise automated feedback, such as an administrator taking an action when the administrator would not take an action for the default risk score determined by the threat intelligence source 227. The feedback may be provided to the machine learning model 260.

In box 412, the vulnerability chaining engine 233 updates the chaining rules 258 (FIG. 2) based at least in part on the feedback and the output of the machine learning model 260. Thereafter, the operation of the portion of the vulnerability chaining engine 233 ends.

Figure 5:
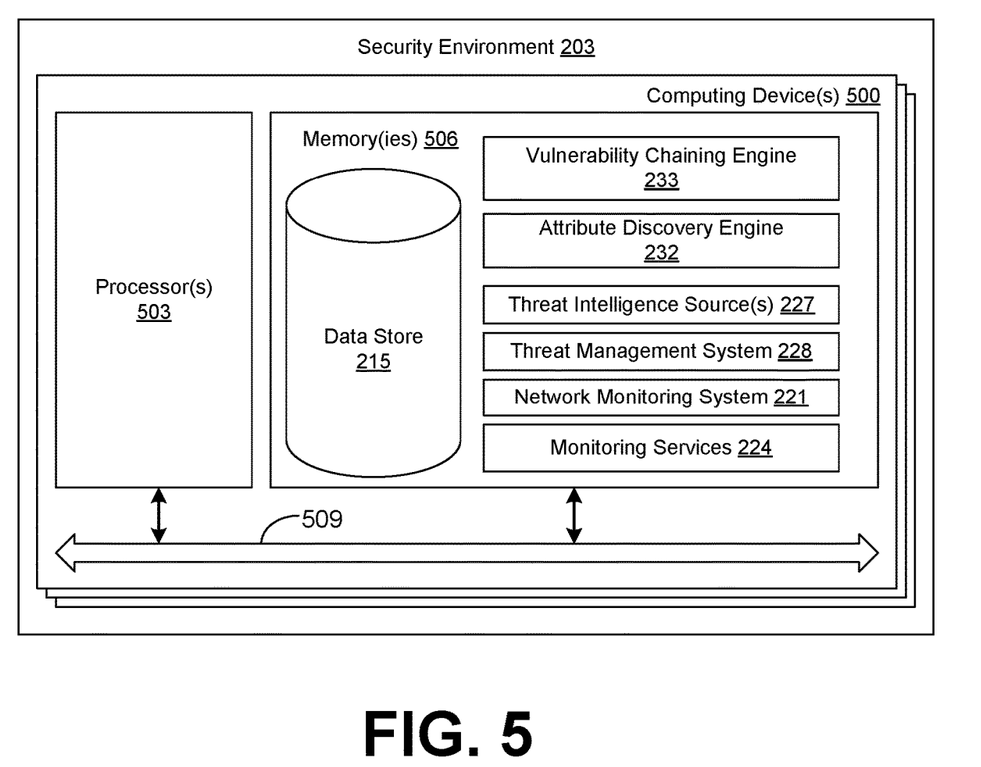
FIG. 5 is a schematic block diagram that provides one example illustration of a security environment employed in the networked environment of FIG. 2 according to various embodiments of the present disclosure.

With reference to FIG. 5, shown is a schematic block diagram of the security environment 203 according to an embodiment of the present disclosure. The security environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the attribute discovery engine 232, the vulnerability chaining engine 233, the monitoring services 224, the network monitoring system 221, one or more threat intelligence sources 227, the threat management system 228, and potentially other applications. Also stored in the memory 506 may be a data store 212 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the attribute discovery engine 232, the vulnerability chaining engine 233, the monitoring services 224, the network monitoring system 221, the threat intelligence source 227, the threat management system 228, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the vulnerability chaining engine 233. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the attribute discovery engine 232, the vulnerability chaining engine 233, the monitoring services 224, the network monitoring system 221, the threat intelligence source 227, and the threat management system 228, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the attribute discovery engine 232, the vulnerability chaining engine 233, the monitoring services 224, the network monitoring system 221, the threat intelligence source 227, and the threat management system 228, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices 500 in the same security environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations Therefore, the following is claimed:

1. A non-transitory computer-readable medium embodying a program executable in at least one computing device, wherein when executed the program causes the at least one computing device to at least:

receive data indicating that a plurality of vulnerabilities are present in a host, individual ones of the plurality of vulnerabilities being assigned a respective default risk score lower than a critical risk score;

receive an external data feed profiling a different vulnerability;

assign at least one vulnerability type to the different vulnerability;

automatically determine, using a chaining rule, that an exploitation of a combination of the plurality of vulnerabilities would result in a chained risk score that is equal to or greater than the critical risk score for the host based at least in part on a combination of respective vulnerability types associated with the individual ones of the plurality of vulnerabilities and at least one attribute of the host, wherein the chained risk score exceeds each of the individual risk scores of the individual ones of the plurality of vulnerabilities, wherein the respective vulnerability types comprise at least two of: a remotely detectable vulnerability type, a remotely exploitable vulnerability type, a privilege-escalation vulnerability type, a patch-available vulnerability type, or a local-authentication-required vulnerability type;

automatically assign the chained risk score to the individual ones of the plurality of vulnerabilities;

generate a recommended action to reduce the chained risk score to, or lower than, a maximum of the respective default risk scores; and cause the recommended action to be performed.

2. The non-transitory computer-readable medium of claim 1, wherein the at least one attribute indicates at least one of: an ease of data exfiltration from the host, a security importance of the host, or a network communication profile of the host.

3. The non-transitory computer-readable medium of claim 1, wherein the chained risk score is assigned to the individual ones of the plurality of vulnerabilities instead of the respective individual risk scores.

4. The non-transitory computer-readable medium of claim 1, wherein the recommended action is to remediate a subset of the plurality of vulnerabilities.

5. The non-transitory computer-readable medium of claim 1, wherein the recommended action is selected from a plurality of possible actions based at least in part on minimizing a time to implement the recommended action, minimizing an impact to system stability associated with the recommended action, or minimizing a system downtime associated with the recommended action.

6. A system, comprising:

at least one computing device comprising a processor and a memory; and a vulnerability chaining engine executable in the at least one computing device, wherein when executed the vulnerability chaining engine causes the at least one computing device to at least:

receive data indicating that a plurality of vulnerabilities are present in at least one host, individual ones of the plurality of vulnerabilities being assigned a respective default risk score;

receive an external data feed profiling a different vulnerability;

assign at least one vulnerability type to the different vulnerability;

applying a chaining rule to determine that an exploitation of a combination of the plurality of vulnerabilities would result in a greater risk score for the at least one host than indicated by the individual respective default risk scores based at least in part on respective vulnerability types associated with the individual ones of the plurality of vulnerabilities;

assign a chained risk score that is higher than the respective default risk scores to the individual ones of the plurality of vulnerabilities;

generate a recommended action to reduce the chained risk score to, or lower than, a maximum of the respective default risk scores; and cause the recommended action to be performed.

7. The system of claim 6, wherein the respective vulnerability types comprise at least two of: a remotely detectable vulnerability type, a remotely exploitable vulnerability type, a privilege-escalation vulnerability type, a patch-available vulnerability type, or a local-authentication-required vulnerability type.

8. The system of claim 6, wherein the chained risk score is generated based at least in part on a risk mapping of combinations of vulnerability types.

9. The system of claim 6, wherein the recommended action is to remediate a subset of the plurality of vulnerabilities.

10. The system of claim 6, wherein when executed the vulnerability chaining engine further causes the at least one computing device to at least identify at least one attribute of the at least one host that when combined with at least one of the respective vulnerability types contributes to the greater risk score, and the chained risk score is based at least in part on the at least one attribute.

11. The system of claim 10, wherein the at least one attribute comprises at least one of: a database present on the at least one host, a host uptime meeting an uptime threshold, a host persistence meeting a persistence threshold, or a hardened security state.

12. The system of claim 10, wherein the at least one attribute comprises a particular utility being installed on the at least one host.

13. The system of claim 10, wherein the at least one attribute comprises at least one of: a network routing table meeting a first quantity threshold, a process table meeting a second quantity threshold, or a quantity of network elements on the at least one host meeting a third quantity threshold.

14. The system of claim 10, wherein the at least one attribute comprises at least one of: a user activity log meeting a first quantity threshold, a quantity of accounts meeting a second quantity threshold, or at least one account on the at least one host meeting a security threshold.

15. The system of claim 6, wherein the at least one host is a single host.

16. The system of claim 6, wherein the at least one host comprises a network of a plurality of related hosts.

17. A method, comprising:

receiving, via at least one of one or more computing devices, data indicating that a plurality of vulnerabilities are present in at least one host, individual ones of the plurality of vulnerabilities being assigned a respective default risk score;

receiving, via at least one of the one or more computing devices, an external data feed profiling a different vulnerability;

assigning, via at least one of the one or more computing devices, at least one vulnerability type to the different vulnerability;

determining, via at least one of the one or more computing devices, using a chaining rule, that an exploitation of a combination of the plurality of vulnerabilities would result in a greater risk score for the at least one host than indicated by the individual respective default risk scores based at least in part on respective vulnerability types associated with the individual ones of the plurality of vulnerabilities;

generating, via at least one of the one or more computing devices, a recommended action to reduce the greater risk score resulting from the combination to a maximum of the respective default risk scores; and causing, via at least one of the one or more computing devices, the recommended action to be performed.

18. The method of claim 17, further comprising selecting, via at least one of the one or more computing devices, the recommended action from a plurality of possible actions based at least in part on minimizing a time to implement the recommended action, minimizing an impact to system stability associated with the recommended action, or minimizing a system downtime associated with the recommended action.

19. The method of claim 17, wherein the recommended action remediates one of the plurality of vulnerabilities.

20. The method of claim 17, further comprising identifying, via at least one of the one or more computing devices, at least one attribute of the at least one host that when combined with at least one of the respective vulnerability types contributes to the greater risk score.

\* \* \* \* \*